Patented Dec. 28, 1943

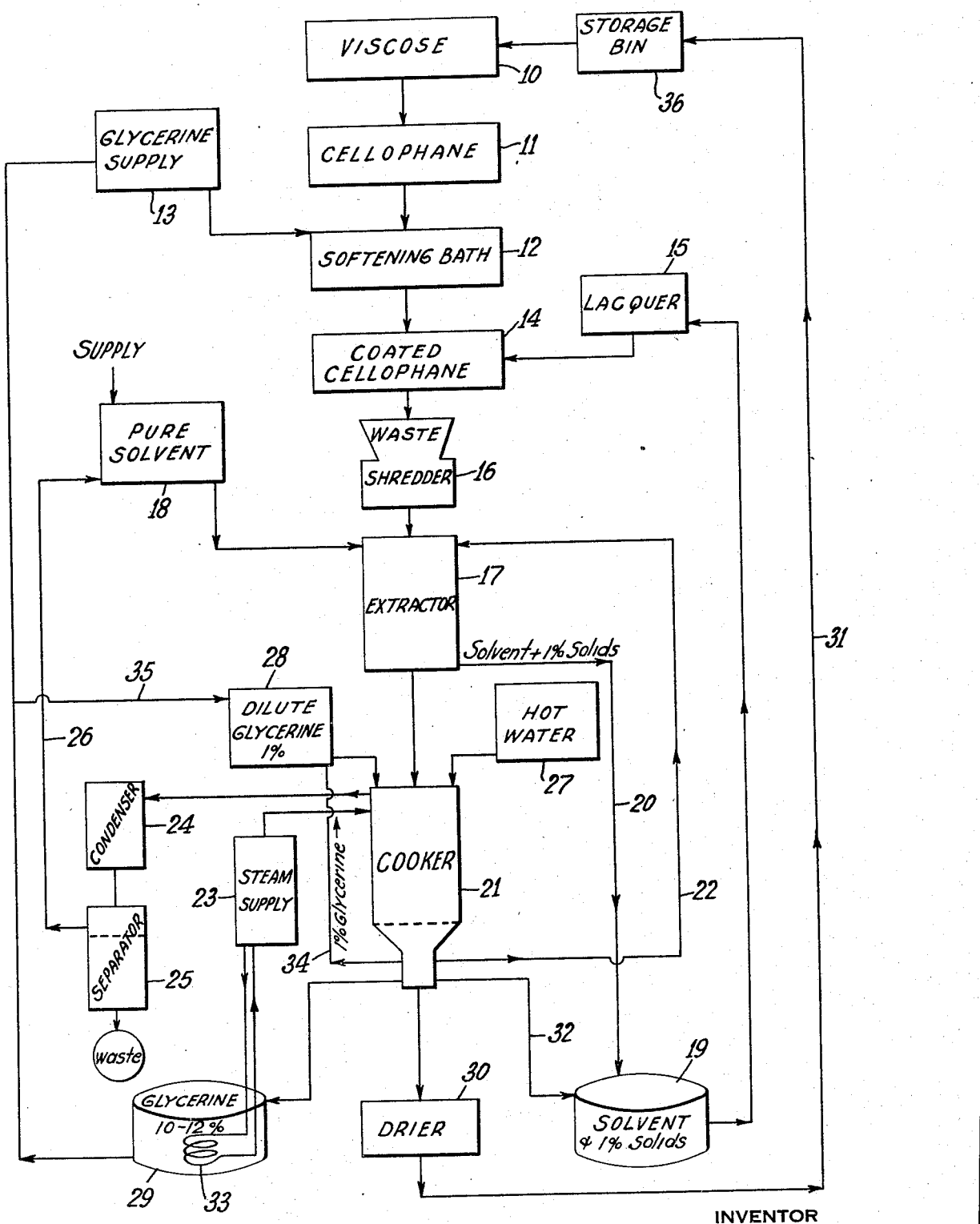

2,337,928

UNITED STATES PATENT OFFICE 2,337,928

PROCESS FOR REUTILIZING WASTE MATERIAL

Frank H. Reichel, Fredericksburg, Va., assignor to Sylvania Industrial Corporation, Fredericksburg, Va., a corporation of Virginia Application June 24, 1940, Serial No. 342,144

10 Claims. (Cl. 18—57)

This invention relates in general to a process for recovering waste materials resulting from the manufacture of articles formed from moistureproofed plasticized regenerated cellulose, and to correlated impovements designed to enable the several ingredients of such waste material to be reused in the manufacture of articles of regenerated cellulose.

Heretofore in the manufacture of articles formed of regenerated cellulose a serious problem has arisen regarding the disposal of waste materials such as strips, scraps, trimmings and imperfect pieces which result from the manufacture of films, filaments, sheets, and tubes formed of regenerated cellulose. The amount of such waste material is generally in excess of the amount which can be converted into industrial uses of the waste, for example, in the manufacture of Christmas decorations, novelties, packing material and the like. Therefore, the reuse of the waste product is essential for industrial economy.

It is therefore a general object of the present invention to provide a process for the continuous recovery and systematic utilization of waste products resulting from the manufacture of articles formed of regenerated cellulose.

It is a further object of the invention to provide a continuous process for the recovery from such waste of the coating compositions, softening agents and. regenerated cellulose used in the manufacture of articles formed of regenerated cellulose.

It is a specific object of the invention to utilize the waste products resulting from the manufacture of articles formed from viscose, for the manufacture of other or similar articles formed from these materials, such as softened, moistureproofed sheets of regenerated cellulose.

Other objects of the invention will in part be obvious and will in part appear hereinafter.

The waste materials treated according to the present invention are those arising from the manufacture of pellicles of regenerated cellulose such, for example, as moistureproof Cellophane, which pellicles as are now commercially available generally comprise sheets and films of regenerated cellulose containing about from 8% to 10% by weight of water and from 15% to 20% by weight of a softening agent such, for example, as glycerine, and on both sides a moistureproof coating normally comprising a cellulose derivative, a plasticizer, a wax and a wax-blending agent. The softening agent is normally soluble and miscible with water, but is insoluble in organic solvents of the type which dissolve the moistureproof coating. On the other hand, the moistureproof coating composition is normally soluble in volatile organic solvents which are normally non-solvents of the softening agent.

According to the process of the present invention, the waste materials resulting from the manufacture of plasticized moistureproof pellicles of regenerated cellulose are comminuted and the comminuted material treated with a solvent for the moistureproof composition which is a nonsolvent for the softening agent thereby stripping the coating from the pellicle, after which the comminuted uncoated material is treated with a solvent for the softening agent whereby the softening agent is extracted and the comminuted material then dried, if desired, or reutilized without drying in the manufacture of viscose or other cellulose derivatives. In the preferred embodiment of the process the regenerated cellulose thus recovered is utilized in the manufacture of pellicles, the softening agent recovered is reutilized in softening such pellicles and the moistureproof composition recovered is reutilized in coating such softened pellicles.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

The regenerated cellulose utilized in the present invention may be derived from viscose or from the de-esterification of cellulose esters such as nitrocellulose or by precipitation from solutions of cellulose in inorganic or organic solvents. However, by way of illustration but not by way of limiting the invention, the present process will be described with reference to the manufacture of regenerated cellulose pellicles from viscose.

The pellicles, before or after they are dried, are usually softened in a conventional manner, such as by passing them through baths comprising solutions of softening agents, such as glycerine, glycol, diethylene glycol, and the like.

In order to render the shaped articles waterproof and/or moistureproof they may be treated or coated in a known manner, such as by means of suitable coating compositions. By way of illustration, a suitable moistureproof coating composition which may be applied to such structures may comprise a lacquer base, a wax, a wax-blending agent and a plasticizer, but it is to be understood that the many and various known moistureproof and/or waterproof coating compositions may be so employed, and it is intended that such compositions be included in this invention.

In a preferred embodiment of the invention, the waste materials are described as resulting from the manufacture of shaped structures such as sheets and films formed of regenerated cellulose, and having present a softening agent and bearing a moistureproof coating composition. These waste materials are comminuted as by shredding, chopping and the like. A batch of such shredded waste material is then treated first with a volatile organic liquid which is a solvent for the moistureproof coating composition, but which is a non-solvent of the softening agent, the remainder of the waste material being further treated in a continuous manner with a solvent for the softening agents present, and then finally treated to recover the regenerated cellulose substantially free from all extraneous materials. The waste materials which are thus recovered are continuously reutilized in the manufacture and formation of new shaped structures of substantially the same character from which the waste materials were derived. Waste materials resulting from the formation of these new shaped structures may then be reutilized in the same manner. Thus it will be seen that the process is continuous, and may be so maintained and kept in operation for an indefinite period of time.

By way of illustrating the invention, and for a more complete understanding of the nature and objects, reference should be had to the attached drawing in which the figure represents a diagram of the flow of materials and the combination of steps in the preferred embodiment. A solution of viscose prepared in a manner known to the art is shown diagrammatically as being contained in tank 10. The viscose solution is then converted into a shaped structure, such as a sheet of Cellophane, by extrusion and precipitation in tank 11. The sheet of Cellophane in the wet-gel state is then washed, purified, and finally softened with a glycerine solution in softening bath 12. Supply tank 13 containing fresh quantities of glycerine is used for introducing fresh supplies of glycerine into softening bath 12 from time to time to replenish the softening agent as it is being taken up and used by the Cellophane sheet.

The softened sheet of Cellophane is then dried in the usual manner and passed to coating machine 14 where it is treated with a moistureproofing composition on one or both sides in a manner known to the art. At this stage, after drying and conditioning the Cellophane sheet material it is ordinarily ready for trimming, rolling, cutting and preparation for sale.

After cutting the sheets, trimming the rolls, and otherwise forming the finished product, the waste material resulting therefrom is gathered together and passed into shredder or cutter 16, wherein it is comminuted into fine particles.

A bath of the shredded waste particles is transferred to extractor 17, where a solvent for the coating composition carried by the waste material is passed into the extractor from the solvent supply tank 18. A suitable solvent which may be used for removing the moistureproof coating composition from the bath of shredded material may comprise a mixture of approximately 60% toluene and 40% butyl acetate. This mixture has an additional advantage in that it is suitable for use as a solvent in moistureproof coating compositions for use on films formed of regenerated cellulose and therefore may be so employed and used in a process for preparing such coating compositions, but it is also to be understood that other suitable solvents may be used when the nature of the coating composition so permits. A solution of the pure solvent described is first used only with the initial batch of shredded waste material, such as at the beginning of a day's operation, or when the recovery process is first initiated. (After such initial treatment, the first or initial batch of waste material treated is treated a second time, this time preferably with a solution which has been used to perform a second extraction of a previously treated batch of waste material. After this second treatment, the extraction solvent which now contains about 1% solids by weight of coating composition is passed directly to the solvent extract storage tank 19 by means of feed line 20. Here the solvent extract is held temporarily and for further disposition pending the accumulation of a sufficient amount of successive solvent batches containing recovered coating composition, and such further disposition of this recovered material will be described hereinafter.)

The initial batch of shredded waste material is then treated a second time with a portion of the pure solvent, and the entire mass together with this solvent is dropped into cooker 21. As this mixture is standing in the cooker to allow time for further extraction of the coating composition, a new batch of waste material is shredded in shredder 16 and transferred to the now empty extractor 17.

The solvent from the second treatment of the initial batch in cooker 21, and containing a large portion of extracted coating composition is now drained from the cooker 21, through feed line 22 and passed to the second shredded batch of waste material in extractor 17. After allowance for a suitable lapse of time to permit extraction of the coating composition, this solvent is then drained from the second batch in extractor 17 and passed to the solvent extract storage tank 19 by means of feed line 20.

A portion of pure solvent is now drawn from solvent supply tank 18 and this solvent, combined with the second batch of shredded waste material in extractor 17, is dropped into cooker 21 where it becomes mixed with the initial batch of extracted waste material. At this stage there are now two batches of comminuted material in the cooker. The solvent is then drawn from these two batches by means of supply line 22 and repassed to a third batch of shredded waste material which has meanwhile been prepared and transferred to extractor 17. The two batches of waste material may now be said to be substantially free of coating composition, but still retain a small amount of the extraction solvent.

Th process is thus repeated as far as the extraction of the coating composition is concerned, using a double extraction treatment on successive batches of shredded waste material, or until it is desired to suspend operations at the close of the day, or to shut down for repairs. At such time the final solvent extract containing the extracted coating composition is not repassed to extractor 17, but is passed directly to the storage tank 19 from the cooker 21 by means of feed line 32.

Referring now to the operations relating to the extraction and reuse of the softening agent, batches of extracted waste material combined in cooker 21 are first treated with steam from boiler 23. This steam is applied to the cooker in order to remove the last traces of residual solvent which may still be present as a result of the extraction process. The treatment of the material with steam completes the removal of the last traces of residual solvent and the batch is now considered free of such moistureproof and/or waterproof coating compositions as well as the residual solvent material, but still containing the softening and/or plasticizing agents. The steam and the residual solvent thus recovered are condensed in condenser tank 24. The condensed water and residual solvent is then passed to separator 25 where they are allowed to separate by gravity and the substantially pure solvent thus recovered is returned with the supply of pure solvent contained in supply tank 18. The water which remains as a result of this condensation and separation process is drained and discarded.

At this point the shredded material remaining in cooker 21 comprises regenerated cellulose and a softening agent, such as glycerine. Substantially no softening agent is removed by the steam treatment or by the action of the solvent used to remove the coating composition since the solvent material used is not a suitable solvent for the softening agent. Likewise the steam treatment does not tend to carry the softening agent over to the condenser 24 to any appreciable extent, due to substantial differences in their respective boiling points and vapor pressures.

The two batches of shredded material remaining in cooker 21 are now treated with a suitable solvent for the softening agents such as hot water, which is supplied by tank 27, in order to remove the glycerine.

This dilute aqueous glycerine solution is then drained through line 34 from cooker 21 into dilute glycerine supply tank 28. This solution containing the dilute glycerine is again passed through the material in cooker 21, and then finally run from cooker 21 to the temporary storage tank 29. After sufficient accumulation of the glycerine, i. e., extracted softening agent, the extract is concentrated to between 10% and 12% glycerine by evaporating the water present. This is done by means of steam coils 33. The concentrated glycerine solution is then transferred to supply tank 13 as a reserve for reuse in the softening bath 12 and used as a softening agent to treat the newly formed sheets of regenerated cellulose or other similar material, as described above. If necessary the extract of dilute glycerine in the supply tank 28 may be replenished from time to time with small quantities of concentrated glycerine from tank 13 by means of line 35. For example, the glycerine which may be concentrated in tank 29 to between 10% and 12% is then mixed with a higher concentration of glycerine in supply tank 13 in order to obtain a solution of approximately 14% by weight of glycerine. This solution of 14% glycerine is now of suitable concentration for use in the softening bath 12 for treatment of sheets and films formed of regenerated cellulose.

The residual shredded waste material substantially free of all softening agents and coating compositions is now conveyed from cooker 21 to dryer 30 where it is gently heated to remove the remaining water and the moisture content. The material thus dried is then conveyed to temporary storage bin 36 where it is used in the manufacture of viscose, or in the manufacture of cellulose ethers and other cellulose derivatives, in a manner known to the art. This step completes the cycle of the cellulosic material.

After sufficient accumulation of the extracted coating composition in temporary reserve tank 19, sufficient quantities are drawn therefrom and used as a source of supply for forming coating compositions formed from regenerated cellulose. This is effected in lacquer tank 15, where suitable adjustment is made in the proportions of the material by compensating for the amount of the coating composition present in the solvent, such as by the addition of further necessary ingredients. The lacquer thus formed is used for coating materials such as those formed from regenerated cellulose, which may be articles similar or identical in structure with those from which the recovered solvents are obtained.

It may be seen from the above disclosure that a process has been provided for recovery and reutilization of waste materials to form substantially the same products or similar products from which the waste materials have been obtained, or for different products having similar characteristics, with substantially no loss or waste. The present invention provides for an outlet for all types of waste material formed from regenerated cellulose except those sheets and films containing dyestuffs and pigments, and thus results in a saving in raw materials and in the expense of disposing of the waste products, which products can, by this process, be economically reutilized.

Since certain changes may be made in the above disclosure and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In a continuous process for recovering and reutilizing waste material resulting from the manufacture of moistureproof pellicles of regenerated cellulose containing a softening agent, the steps comprising extracting the waste material with an organic solvent for the moistureproof composition, which solvent is a non-solvent for the softening agent and the regenerated cellulose, and separately recovering the moistureproof composition, thereafter extracting the material with a solvent for the softening agent, which solvent is a non-solvent for the regenerated cellulose, and separately recovering the softening agent, finally recovering the regenerated cellulose substantially free of moistureproof compositions and softening agents, and reutilizing the separated materials in the manufacture of said moistureproof pellicles of regenerated cellulose.

2. In a continuous process for recovering and reutilizing waste material resulting from the manufacture of moistureproof pellicles of regenerated cellulose containing a softening agent, the steps comprising extracting the waste material with an organic solvent for the moistureproof composition, which solvent is a non-solvent for the softening agent and the regenerated cellulose, and separately recovering the moistureproof composition, thereafter extracting the material with a solvent for the softening agent, which solvent is a non-solvent for the regenerated cellulose, and separately recovering the softening agent, finally recovering the regenerated cellulose substantially free of moistureproof compositions and softening agents, and reutilizing the separated moistureproof composition and the separated softening agent in the manufacture of said moistureproof pellicles of regenerated cellulose.

3. In a continuous process for recovering and reutilizing waste material resulting from the manufacture of moistureproof pellicles of regenerated cellulose containing a softening agent, the steps comprising extracting the waste material with an organic solvent for the moistureproof composition, which solvent is a non-solvent for the softening agent and the regenerated cellulose, and separately recovering the moistureproof composition, thereafter extracting the material with a solvent for the softening agent, which solvent is a non-solvent for the regenerated cellulose, and separately recovering the softening agent, finally recovering the regenerated cellulose substantially free of moistureproof compositions and softening agents, and reutilizing the separated moistureproof composition and the recovered regenerated cellulose residue in the manufacture of said moistureproof pellicles of regenerated cellulose.

4. In a continuous process for recovering and reutilizing waste material resulting from the manufacture of moistureproof pellicles of regenerated cellulose containing a softening agent, the steps comprising extracting the waste material with an organic solvent for the moistureproof composition, which solvent is a non-solvent for the softening agent and the regenerated cellulose, and separately recovering the moistureproof composition, thereafter extracting the material with a solvent for the softening agent, which solvent is a non-solvent for the regenerated cellulose, and separately recovering the softening agent, finally recovering the regenerated cellulose substantially free of moistureproof compositions and softening agents, and reutilizing the separated moistureproof composition in the manufacture of said moistureproof pellicles of regenerated cellulose.

5. In a continuous process for recovering and reutilizing waste material resulting from the manufacture of moistureproof pellicles of regenerated cellulose containing a water-soluble softening agent, the steps comprising extracting the waste material with an organic solvent for the moistureproof composition which solvent is a non-solvent for the softening agent and the regenerated cellulose, and separately recovering the moistureproof composition, thereafter extracting the material with a solvent for the softening agent comprising water, which solvent is a non-solvent for the regenerated cellulose, and separately recovering the softening agent, finally recovering the regenerated cellulose substantially free of moistureproof compositions and softening agents and reutilizing the separated moistureproof composition and the separated softening agent in the manufacture of said moistureproof pellicles of regenerated cellulose.

6. In a continuous process for recovering and reutilizing waste material resulting from the manufacture of moistureproof pellicles of regenerated cellulose containing a softening agent comprising glycerol, the steps comprising comminuting said waste material, extracting said comminuted material with an organic solvent for the moistureproof composition, which solvent is a non-solvent for the glycerol and the regenerated cellulose, and separately recovering the moistureproof composition, thereafter extracting the material with a solvent for the glycerol, which solvent is a non-solvent for the regenerated cellulose and separately recovering the glycerol, finally recovering the regenerated cellulose substantially free of moistureproof compositions and softening agents, and reutilizing the separated moistureproof composition and the separated softening agent in the manufacture of said moistureproof pellicles of regenerated cellulose.

7. In a continuous process for recovering and reutilizing waste material resulting from the manufacture of moistureproof pellicles of regenerated cellulose containing a softening agent, the steps comprising extracting the waste material with a solvent comprising a mixture of toluene and butyl acetate for the moistureproof composition, which solvent is a non-solvent for the softening agent and the regenerated cellulose, and separately recovering the moistureproof composition, thereafter extracting the material with a solvent for the softening agent, which solvent is a non-solvent for the regenerated cellulose and separately recovering the softening agent, finally recovering the regenerated cellulose substantially free of moistureproof compositions and softening agents, and reutilizing the separated moistureproof composition in the manufacture of said moistureproof pellicles of regenerated cellulose.

8. In a continuous process for recovering and reutilizing waste material resulting from the manufacture of moistureproof pellicles of regenerated cellulose containing a softening agent, the steps comprising comminuting said waste material, extracting said comminuted material with an organic solvent for the moistureproof composition, which solvent is a non-solvent for the softening agent and the regenerated cellulose, and separately recovering the moistureproof composition, thereafter treating said material with steam to remove residual solvent adhering to the waste material, extracting said material with a solvent for the softening agent, which solvent is a non-solvent for the regenerated cellulose, conducting said extraction at an elevated temperature insufficient to decompose the regenerated cellulose and separately recovering the softening agent, finally recovering the regenerated cellulose substantially free of moistureproof compositions and softening agents, and reutilizing the separated materials in the manufacture of said moistureproof pellicles of regenerated cellulose.

9. In a continuous process for recovering and reutilizing waste material resulting from the manufacture of moistureproof pellicles of regenerated cellulose containing a softening agent, the steps comprising comminuting said waste material, extracting said comminuted material with a solvent comprising a mixture of toluene and butyl acetate for the moistureproof composition, which solvent is a non-solvent for the softening agent and the regenerated cellulose, and separately recovering the moistureproof composition, thereafter treating said material with steam to remove residual solvent adhering to the waste material, extracting said material with a solvent for the softening agent comprising water, which solvent is a non-solvent for the regenerated cellulose, conducting said extraction at an elevated temperature insufficient to decompose the regenerated cellulose and separately recovering the softening agent, finally recovering the regenerated cellulose substantially free of moistureproof compositions and softening agents, and reutilizing the separated materials in the manufacture of said moistureproof pellicles of regenerated cellulose.

10. In a continuous process for recovering and reutilizing waste material resulting from the manufacture of moistureproof pellicles of regenerated cellulose containing a softening agent, the steps comprising comminuting said waste material, extracting a batch of said comminuted material with an organic solvent for the moistureproof composition, which solvent is a non-solvent for the softening agent and the regenerated cellulose, and separately recovering the moistureproof composition, repeating said extraction of said batch of comminuted material with an organic solvent for the moistureproof composition, and thereafter treating a second batch of comminuted material with the solvent containing a small quantity of the moistureproof composition resulting from the second treatment of said first batch, separately recovering the moistureproof composition resulting from said extraction of said second batch, combining the extracted materials comprising said first and second batches, and treating said batches with steam to remove residual solvent adhering to said batches, and recovering said residual solvent resulting from said steam extraction, the steam treatment being insufficient to decompose the regenerated cellulose and remove the softening agent, thereafter extracting said combined batches with a solvent for the softening agent, which solvent is a non-solvent for the regenerated cellulose, conducting said extraction of the softening agent at an elevated temperature insufficient to decompose the regenerated cellulose, and separately recovering the softening agent, finally recovering the regenerated cellulose substantially free of moistureproof compositions and softening agents, and reutilizing the separated materials in the manufacture of said moistureproof pellicles of regenerated cellulose.

FRANK H. REICHEL.